Patented Oct. 27, 1942

2,299,938

UNITED STATES PATENT OFFICE 2,299,938

PREPARATION OF 2-MERCAPTO-THIAZOLINES

Bernard M. Sturgis, Pitman, N. J., assignor to E. I. du Pont de Nemours & Company, Wilmington, Del., a corporation of Delaware No Drawing. Application December 5, 1939, Serial No. 307,583

21 Claims. (Cl. 260—302)

The invention relates to the preparation of 2-mercapto-thiazolines and more particularly to improved methods for the production of 2-mercapto-thiazolines from ethylene imines.

Some 2-mercapto-thiazolines have been made previously by reacting ethylene imines with carbon disulfide in ether at low temperatures, followed by warming the reaction products on a steam bath after evaporation of the ether. The 2-mercapto thiazolines were recovered from the resulting semi-crystalline mass in very low yields.

It is an object of the present invention to provide an improved method for the production of 2-mercapto-thiazolines from ethylene imines in high yields and in a high state of purity. Another object is to provide a method of preparing 2-mercapto-thiazolines without the formation of substantial amounts of gaseous reaction products or other undesirable by-products. Further objects are to improve the art. Still further objects will appear hereinafter.

The above and other objects of my invention may be accomplished by heating at least one mole of carbon disulfide with one mole of an ethylene imine in a closed reaction vessel at temperatures above 100° C. in the absence of substantial amounts of water and in the absence of basic and acidic substances. I have found that, when the reaction is carried out under such conditions, high yields of 2-mercapto-thiazolines in a very pure state are obtained.

When the 2-mercapto-thiazolines were prepared from ethylene imines by the methods of the prior art, only very low yields of from about 5 to 25% of the 2-mercapto-thiazolines were obtained. The reaction products were gummy and semi-crystalline materials containing large amounts of other products from which the 2-mercapto-thiazolines had to be separated. I have found that such other products, produced by the methods of the prior art, comprise the dithiocarbamic acids of the ethylene imines and the ethylene imine salts of such dithiocarbamic acids. When the conditions of my invention are employed, the 2-mercapto-thiazolines are obtained substantially pure and the reaction product contains very little or no dithiocarbamic acids or their salts.

Since the ethylene imines react extremely vigorously with carbon disulfide in the absence of a solvent, I prefer to carry out the reaction in a solvent. Any inert neutral organic solvent may be used, such as alcohols, their ethers and esters, ketones and aromatic and aliphatic hydrocarbons and particularly the lower aliphatic alcohols and ketones of 1 to 6 carbon atoms. Representative solvents are ethanol, methanol, propanol, isopropanol, acetone, benzene, xylene, gasoline, cyclohexane, ethyl acetate, ether and mixtures of two or more of such solvents. The preferred solvents are ethanol and acetone, as somewhat higher yields have been obtained by their use. Water cannot be used as a solvent since, in the presence of substantial amounts of water, the reaction seems to follow a different course and no thiazoline is produced. Small amounts of water, however, such as are normally present in commercial alcohol and commercial acetone, do not adversely influence the reaction. However, not more than about 10% of water, based on the reacting ingredients should be present. I have also found that the reaction will not take place in the presence of alkali and hence alkali must be excluded from the mixture during the reaction. Furthermore, acidic materials are deleterious and undesirable during the reaction. Hence, the term "inert neutral organic solvent," as employed herein and in the claims, excludes the presence of basic and acidic substances other than the imine.

In general, the temperatures employed for carrying out the reaction, will be above 100° C. and particularly between 100° C. and 200° C. Preferably, I use temperatures of from about 120° C. to about 170° C. At such temperatures, the reacting ingredients and the solvent are generally volatilized and hence it is desirable to employ a closed reaction vessel. Since no gaseous reaction products are formed, the pressures produced in the reaction vessel will be due solely to the vapors of the reacting ingredients and the solvent and hence the pressures will be low. Accordingly, a low pressure vessel may be used for the reaction. Although the reaction normally takes place at the low pressures generated by the vapors of carbon disulfide and the solvent, higher pressures can be employed and such higher pressures may be obtained by introducing, into the reaction vessel, nitrogen or other inert gases under pressure. The time of heating will be dependent upon the temperatures employed, although from about 5 to about 15 hours is usually sufficient. Excellent yields of the products are generally obtained in about 5 to 6 hours.

The absence of by-products renders the purification of the thiazolines simple or entirely unnecessary. Usually, the reaction product is obtained in the form of crystals which need no purification. If further purification is desired, it can be readily accomplished by dissolving the reaction product in alkali and reprecipitating the 2-mercapto-thiazoline by the addition of acid. Purification can also be accomplished by crystallization of the 2-mercapto-thiazoline from various solvents, such as water, alcohol or benzene or by dissolving the 2-mercapto-thiazoline in concentrated sulfuric acid and then diluting with water.

The amount of carbon disulfide employed may be varied from one mole to two or more moles for each mole of imine. However, no advantage is to be gained in using very much more than one mole. Preferably, I employ from about 1.0 to about 1.5 moles of carbon disulfide for each mole of imine. Also, the amount of solvent employed may be widely varied. In general, sufficient should be used so that the initial reaction between the imine and the carbon disulfide is not too violent. Usually one or more moles of solvent is used for each mole of imine.

2-mercapto-thiazoline has the formula:

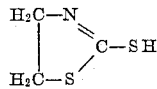

The class of 2-mercapto-thiazolines, prepared in accordance with my invention, may be represented by the formula:

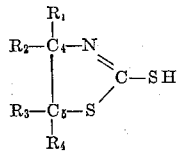

wherein each of $R_1$, $R_2$, $R_3$ and $R_4$ represents hydrogen or one or more of $R_1$, $R_2$, $R_3$ and $R_4$ represents alkyl or aryl radicals or substituted alkyl or aryl radicals in which the substituents may be hydroxyl, halogen, alkoxy, aryloxy or similar groups. In accordance with my invention, these 2-mercapto-thiazolines are prepared from ethylene imines which may be represented by the following formula:

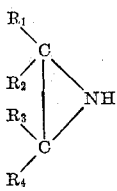

wherein $R_1$, $R_2$, $R_3$ and $R_4$ represent hydrogen or alkyl, aryl, substituted alkyl or substituted aryl radicals as above indicated. The preferred embodiment of my invention is the preparation of 2-mercapto-thiazoline from ethylene imine. The next most important embodiment of my invention comprises the preparation of the corresponding 2-mercapto-thiazolines from ethylene imines in which one or more of $R_1$, $R_2$, $R_3$ and $R_4$ represents lower alkyl radicals of 1 to 6 carbon atoms and the rest of $R_1$, $R_2$, $R_3$ and $R_4$ represent hydrogen. In other words, the second most important embodiment of my invention comprises the reaction of carbon disulfide with substituted ethylene imines in which the substituents are restricted to lower alkyl groups.

In order to illustrate my invention more clearly, the preferred modes of carrying the same into effect and the advantageous results to be obtained thereby, the following examples are given.

*Example I*

Eleven grams of ethylene imine, 19 grams of carbon disulfide, and 50 grams of 95% ethanol were heated in a closed vessel for 7 hours at 150° C. The alcohol was evaporated from the product, which was then dissolved in sodium hydroxide, precipitated with hydrochloric acid, filtered and dried. A yield of 94% of 2-mercapto-thiazoline in the form of a fine white powder melting at 104°–105° C. was obtained.

*Example II*

Eleven grams of ethylene imine, 19 grams of carbon disulfide, and 80 grams of acetone were heated in a closed vessel for 7 hours at 150° C. The acetone was evaporated from the resulting solution, leaving white crystals of 2-mercapto-thiazoline. The yield was 95% of theory.

*Example III*

One gram mole of ethylene imine, one gram mole of carbon disulfide, and one gram mole of alcohol were placed in a pressure vessel which was closed and heated for 10 hours at 120° C. The resulting white crystalline product was recrystallized from alcohol after which it melted at 104°–105° C. The yield of 2-mercapto-thiazoline was 94% of theory.

*Example IV*

The process of Example I was repeated except that benzene was used as the solvent. A yield of 60% of white 2-mercapto-thiazoline was produced.

*Example V*

One gram mole of 2-methyl-2-ethyl ethylene imine, one gram mole of carbon disulfide, and two gram moles of alcohol were heated in a closed vessel for 6 hours at 150° C. The alcohol was evaporated from the product, which then was dissolved in alkali and reprecipitated with acid. An 80% yield of 4-methyl-4-ethyl-2-mercapto-thiazoline was obtained.

*Example VI*

The process of Example V was repeated using 2-ethyl-3-propyl ethylene imine. After purification, a 73% yield of 4-propyl-5-ethyl-2-mercapto-thiazoline was obtained.

*Example VII*

The process of Example V was repeated using 2-propyl ethylene imine. 4-propyl-2-mercapto thiazoline was obtained in 50% yield.

*Example VIII*

43 grams of ethylene imine (1 mole) was dissolved in 200 grams of ether and the solution cooled in an ice bath. 76 grams (1 mole) of carbon disulfide diluted with 50 grams of cold ether was added slowly with stirring. A yellow waxlike solid was formed which was separated from the ether. This solid material was then heated on a steam bath, during which time, gas was evolved. It was converted to a glassy, semicrystalline material which was boiled with water, filtered, and the filtrate evaporated. Five grams of white 2-mercapto-thiazoline were obtained. This was less than a 5% conversion.

The yields, given in the above examples, are calculated on the basis of the total ethylene imine started with, wherein 100% yield would represent conversion of the total amount of the ethylene imine to the mercapto-thiazoline in the single operation described in each case.

Example 8 illustrates the best mode, known to the prior art, for the preparation of 2-mercapto-thiazoline from ethylene imine. A comparison of this example with Examples 1 to 7 clearly illustrates the advantage of my invention.

In the preceding examples, I have disclosed the preparation of a few 2-mercapto-thiazolines from representative ethylene imines. Other ethylene imines may be employed to produce other thiazolines, as follows:

| Ethylene imines | Yielding thiazolines— |
|---|---|
| 2-methyl ethylene imine | 4-methyl-2-mercapto-thiazoline |
| 2-ethyl ethylene imine | 4-ethyl-2-mercapto-thiazoline |
| 2,2-dimethyl ethylene imine | 4,4-dimethyl-2-mercapto-thiazoline |
| 2,2-dimethyl-3-methyl ethylene imine | 4,4-dimethyl-5-methyl-2-mercapto-thiazoline. |
| 2-hydroxymethyl ethylene imine | 4-hydroxymethyl-2-mercapto-thiazoline. |
| 2-ethyl-2-hydroxymethyl ethylene imine | 4-ethyl-4-hydroxymethyl-2-mercapto-thiazoline. |
| 2-propyl-3-methyl ethylene imine. | 4-propyl-5-methyl-2-mercapto-thiazoline. |
| 2-propyl-3-isopropyl ethylene imine. | 4-propyl-5-isopropyl-2-mercapto-thiazoline. |
| 2,2-dimethyl-3-propyl ethylene imine. | 4-propyl-5,5-dimethyl-2-mercapto-thiazoline. |
| 2-methyl-2-ethyl-3-propyl ethylene imine. | 4-propyl-5-methyl-5-ethyl-2-mercapto-thiazoline. |
| 2-propyl-3-propyl ethylene imine. | 4-propyl-5-propyl-2-mercapto-thiazoline. |
| 2-phenyl ethylene imine | 4-phenyl-2-mercapto-thiazoline. |
| 2-ortho-chlorophenyl ethylene imine. | 4-ortho-chlorophenyl-2-mercapto-thiazoline. |
| 2,3-diphenyl ethylene imine | 4-phenyl-5-phenyl-2-mercapto-thiazoline. |

The 2-mercapto-thiazolines, prepared in accordance with my invention, are accelerators for the vulcanization of rubber. They are produced in accordance with my invention, in the form of powders or crystalline materials of high purity which are easily ground and are readily dispersible in rubber. They are generally sufficiently pure so that they can be employed without further purification. They are generally odorless and hence impart no odor or discloration to vulcanized rubber.

A particular advantage of the process of my invention is that no gaseous products, such as hydrogen sulfide or carbon oxysulfide, are produced in the reaction. Thus, in contrast to most processes for the preparation of 2-mercapto-thiazolines, vessels, capable of withstanding only relatively low pressures, can be used and there are no obnoxious gaseous reaction products to be dealt with.

While I have disclosed the preferred embodiments of my invention and the preferred modes of carrying the same into effect, such embodiments have been given for illustrative purposes only and it will be readily apparent to those skilled in the art that many variations and modifications can be made therein, particularly in the ethylene imines employed, the solvent, etc., without departing from the spirit of my invention. Accordingly, the scope of my invention is not to be limited to the specific examples particularly described but I intend to claim my invention broadly as in the appended claims.

I claim:

1. The method of preparing a 2-mercapto-thiazoline which comprises heating at least one mole of carbon disulfide with one mole of an ethylene imine in an inert neutral substantially non-aqueous, containing not more than 10% water, organic solvent in a closed vessel at temperatures of from 100° C. to 200° C. so as to maintain the volatile ingredients in contact with the reacting mass and at a pressure at least equal to the vapor pressure of the volatile ingredients at such temperatures.

2. The method of preparing a 2-mercapto-thiazoline which comprises heating at least one mole of carbon disulfide with one mole of an ethylene imine which, except for the nitrogen of the imine group, consists of carbon and hydrogen in an inert neutral substantially non-aqueous, containing not more than 10% water, organic solvent in a closed vessel at temperatures of from 100° C. to 200° C. so as to maintain the volatile ingredients in contact with the reacting mass and at a pressure at least equal to the vapor pressure of the volatile ingredients at such temperatures.

3. The method of preparing a 2-mercapto-thiazoline which comprises heating at least one mole of carbon disulfide with one mole of an ethylene imine which, except for the nitrogen of the imine group, consists of carbon and hydrogen and which is free of benzene rings in an inert neutral substantially non-aqueous, containing not more than 10% water, organic solvent in a closed vessel at temperatures of from 100° C. to 200° C. so as to maintain the volatile ingredients in contact with the reacting mass and at a pressure at least equal to the vapor pressure of the volatile ingredients at such temperatures.

4. The method of preparing 2-mercapto-thiazoline which comprises heating at least one mole of carbon disulfide with one mole of ethylene imine in an inert neutral substantially non-aqueous, containing not more than 10% water, organic solvent in a closed vessel at temperatures of from 100° C. to 200° C. so as to maintain the volatile ingredients in contact with the reacting mass and at a pressure at least equal to the vapor pressure of the volatile ingredients at such temperatures.

5. The method of preparing a 2-mercapto-thiazoline which comprises heating at least one mole of carbon disulfide with one mole of a 2-alkyl ethylene imine in an inert neutral substantially non-aqueous, containing not more than 10% water, organic solvent in a closed vessel at temperatures of from 100° C. to 200° C. so as to maintain the volatile ingredients in contact with the reacting mass and at a pressure at least equal to the vapor pressure of the volatile ingredients at such temperatures.

6. The method of preparing a 2-mercapto-thiazoline which comprises heating at least one mole of carbon disulfide with one mole of an ethylene imine in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

7. The method of preparing a 2-mercapto-thiazoline which comprises heating at least one mole of carbon disulfide with one mole of an ethylene imine which, except for the nitrogen of the imine group, consists of carbon and hydrogen in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

8. The method of preparing a 2-mercapto-thiazoline which comprises heating at least one mole of carbon disulfide with one mole of an ethylene imine which, except for the nitrogen of the imine group, consists of carbon and hydrogen and which is free of benzene rings in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

9. The method of preparing 2-mercapto-thiazoline which comprises heating at least one mole of carbon disulfide with one mole of ethylene imine in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

10. The method of preparing a 2-mercapto-thiazoline which comprises heating at least one mole of carbon disulfide with one mole of a 2-alkyl-ethylene imine in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

11. The method of preparing 4-methyl-4-ethyl-2-mercapto-thiazoline which comprises heating at least one mole of carbon disulfide with one mole of 2-methyl-2-ethyl ethylene imine in an inert neutral substantially non-aqueous, containing not more than 10% water, organic solvent in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

12. The method of preparing a 2-mercapto-thiazoline which comprises heating at least one mole of carbon disulfide with one mole of an ethylene imine in a substantially non-aqueous, containing not more than 10% water, lower aliphatic alcohol in a closed vessel at temperatures of from 100° C. to 200° C. so as to maintain the volatile ingredients in contact with the reacting mass and at a pressure at least equal to the vapor pressure of the volatile ingredients at such temperatures.

13. The method of preparing a 2-mercapto-thiazoline which comprises heating at least one mole of carbon disulfide with one mole of an ethylene imine which, except for the nitrogen of the imine group, consists of carbon and hydrogen in a substantially non-aqueous, containing not more than 10% water, lower aliphatic alcohol in a closed vessel at temperatures of from 100° C. to 200° C. so as to maintain the volatile ingredients in contact with the reacting mass and at a pressure at least equal to the vapor pressure of the volatile ingredients at such temperatures.

14. The method of preparing a 2-mercapto-thiazoline which comprises heating at least one mole of carbon disulfide with one mole of an ethylene imine in a substantially non-aqueous, containing not more than 10% water, lower aliphatic alcohol in a closed vessel at temperatures of from 120° C. to 170° C. so as to maintain the volatile ingredients in contact with the reacting mass and at a pressure at least equal to the vapor pressure of the volatile ingredients at such temperatures.

15. The method of preparing a 2-mercapto-thiazoline which comprises heating at least one mole of carbon disulfide with one mole of an ethylene imine which, except for the nitrogen of the imine group, consists of carbon and hydrogen in a substantially non-aqueous, containing not more than 10% water, lower aliphatic alcohol in a closed vessel at temperatures of from substantially 120° C. to substantially 170° C. so as to maintain the volatile ingredients in contact with the reacting mass and at a pressure at least equal to the vapor pressure of the volatile ingredients at such temperature.

16. The method of preparing a 2-mercapto-thiazoline which comprises heating at least one mole of carbon disulfide with one mole of an ethylene imine which, except for the nitrogen of the imine group, consists of carbon and hydrogen and which is free of benzene rings in a substantially non-aqueous, containing not more than 10% water, lower aliphatic alcohol in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

17. The method of preparing 2-mercapto-thiazoline which comprises heating at least one mole of carbon disulfide with one mole of ethylene imine in a substantially non-aqueous, containing not more than 10% water, lower aliphatic alcohol in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

18. The method of preparing 4-methyl-4-ethyl-2-mercapto-thiazoline which comprises heating at least one mole of carbon disulfide with one mole of 2-methyl-2-ethyl ethylene imine in a substantially non-aqueous, containing not more than 10% water, lower aliphatic alcohol in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

19. The method of preparing 2-mercapto-thiazoline which comprises heating at least one mole of carbon disulfide with one mole of ethylene imine in substantially non-aqueous, containing not more than 10% water, ethyl alcohol in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

20. The method of preparing 2-mercapto-thiazoline which comprises heating at least one mole of carbon disulfide with one mole of ethylene imine in a substantially non-aqueous, containing not more than 10% water, lower aliphatic ketone of from 3 to 6 carbon atoms in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

21. The method of preparing 2-mercapto-thiazoline which comprises heating at least one mole of carbon disulfide with one mole of ethylene imine in substantially non-aqueous, containing not more than 10% of water, acetone in a closed vessel at temperatures of from substantially 120° C. to substantially 170° C. so as to maintain the volatile ingredients in contact with the reacting mass and at a pressure at least equal to the vapor pressure of the volatile ingredients at such temperatures.

BERNARD M. STURGIS.